US012802968B2

(12) United States Patent
Cho et al.

(10) Patent No.: US 12,802,968 B2
(45) Date of Patent: Nov. 17, 2026

(54) POSITIVE ELECTRODE FOR LITHIUM SECONDARY BATTERY AND LITHIUM SECONDARY BATTERY COMPRISING SAME

(71) Applicant: LG ENERGY SOLUTION, LTD., Seoul (KR)

(72) Inventors: Hyunah Cho, Daejeon (KR); Jeehyun Ahn, Daejeon (KR); Changhoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 525 days.

(21) Appl. No.: 18/283,777

(22) PCT Filed: Oct. 27, 2022

(86) PCT No.: PCT/KR2022/016525
§ 371 (c)(1),
(2) Date: Sep. 22, 2023

(87) PCT Pub. No.: WO2023/090682
PCT Pub. Date: May 25, 2023

(65) Prior Publication Data

US 2024/0178369 A1 May 30, 2024

(30) Foreign Application Priority Data

Nov. 18, 2021 (KR) ........................ 10-2021-0159053

(51) Int. Cl.
*H01M 4/36* (2006.01)
*H01M 4/02* (2006.01)
(Continued)

(52) U.S. Cl.
CPC ......... *H01M 4/364* (2013.01); *H01M 4/5815* (2013.01); *H01M 4/587* (2013.01);
(Continued)

(58) Field of Classification Search
CPC .... H01M 4/364; H01M 4/5815; H01M 4/587; H01M 4/622; H01M 10/052;
(Continued)

(56) References Cited

U.S. PATENT DOCUMENTS

2004/0009393 A1 1/2004 Kim et al.
2004/0101753 A1 5/2004 Hwang
(Continued)

FOREIGN PATENT DOCUMENTS

CN 109378466 A 2/2019
CN 109928750 A 6/2019
(Continued)

OTHER PUBLICATIONS

Liu et al. "Electrochemical behavior study of carbon nanofiber/MnO2 composites as sulfur host for highly effective polysulfide absorbent," Ionics (2021) 27:207-212, 6 pages.
(Continued)

*Primary Examiner* — Christian Roldan
(74) *Attorney, Agent, or Firm* — Bryan Cave Leighton Paisner LLP

(57) ABSTRACT

A positive electrode for a lithium secondary battery and a lithium secondary battery including the same are provided. The positive electrode comprises a positive electrode active material layer including a sulfur-carbon composite which is a positive electrode active material, a binder, and a metal oxide-based additive, and provides improved discharging capacity and lifetime characteristics of the lithium secondary battery.

9 Claims, 2 Drawing Sheets

(51) Int. Cl.

| | |
|---|---|
| ***H01M 4/58*** | (2010.01) |
| ***H01M 4/587*** | (2010.01) |
| ***H01M 4/62*** | (2006.01) |
| ***H01M 4/66*** | (2006.01) |
| ***H01M 10/052*** | (2010.01) |
| ***H01M 50/105*** | (2021.01) |

(52) U.S. Cl.

CPC ......... *H01M 4/622* (2013.01); *H01M 10/052* (2013.01); *H01M 50/105* (2021.01); *H01M 2004/028* (2013.01)

(58) Field of Classification Search

CPC ......... H01M 50/105; H01M 2004/028; H01M 4/136; H01M 4/362; H01M 4/38; H01M 4/661; H01M 4/02; H01M 4/13; H01M 4/62; H01M 4/625; Y02E 60/10

See application file for complete search history.

(56) References Cited

U.S. PATENT DOCUMENTS

| | | | | |
|---|---|---|---|---|
| 2009/0226809 | A1 | 9/2009 | Vu et al. | |
| 2013/0071761 | A1* | 3/2013 | Amine .................. | H01M 4/925 429/405 |
| 2019/0103600 | A1* | 4/2019 | Greer .................. | H01M 4/8626 |
| 2019/0181449 | A1* | 6/2019 | Han ........................ | H01M 4/62 |
| 2020/0299444 | A1 | 9/2020 | Lee et al. | |
| 2021/0083283 | A1 | 3/2021 | Han et al. | |
| 2021/0083299 | A1 | 3/2021 | Ozawa et al. | |
| 2021/0218075 | A1* | 7/2021 | Grey ..................... | H01M 4/483 |

FOREIGN PATENT DOCUMENTS

| | | | |
|---|---|---|---|
| CN | 111056572 | A | 4/2020 |
| CN | 111095633 | A | 5/2020 |
| CN | 111542948 | A | 8/2020 |
| CN | 111653783 | A | 9/2020 |
| JP | 2004-179160 | A | 6/2004 |
| JP | 2005-108438 | A | 4/2005 |
| JP | 2019-531243 | A | 10/2019 |
| KR | 10-2011-0027644 | A | 3/2011 |
| KR | 10-2015-0046861 | A | 5/2015 |
| KR | 10-2018-0138133 | A | 12/2018 |
| KR | 10-2019-0051448 | A | 5/2019 |
| KR | 10-2019-0063699 | A | 6/2019 |
| KR | 10-2020-0008421 | A | 1/2020 |
| KR | 10-2021-0088025 | A | 7/2021 |
| WO | 2019/230592 | A1 | 12/2019 |
| WO | 2021/074406 | A1 | 4/2021 |

OTHER PUBLICATIONS

Search Report for EP Patent Application No. 22895890.6 dated Feb. 10, 2025.

International Search Report from PCT/KR2022/016525, dated Feb. 7, 2023.

Written Opinion of the ISA from PCT/KR2022/016525, dated Feb. 7, 2023.

Lu Wang et al., "To effectively drive the conversion of sulfur with electroactive niobium tungsten oxide microspheres for lithium-sulfur battery", Nano Energy, vol. 77, Nov. 2020, 105173, pp. 1-11.

Yumi Kim et al., "High Rate Lithium Ion Battery with Niobium Tungsten Oxide Anode", Journal of The Electrochemical Society, 2021, 168, 010525, 9 pages.

* cited by examiner

POSITIVE ELECTRODE FOR LITHIUM SECONDARY BATTERY AND LITHIUM SECONDARY BATTERY COMPRISING SAME

CROSS-REFERENCE TO RELATED APPLICATION(S)

This application is a National Stage Application of International Application No. PCT/KR2022/016525, filed on Oct. 27, 2022, which claims the benefit of priority based on Korean Patent Application No. 2021-0159053, filed on Nov. 18, 2021, the disclosures of which are incorporated herein by reference in their entirety.

FIELD OF DISCLOSURE

The present disclosure relates to a positive electrode for a lithium secondary battery and a lithium secondary battery comprising the same.

BACKGROUND

Recently, with the rapid development in the field of electronic devices and electric vehicles, the demand for secondary batteries is increasing. Particularly, with the trend toward miniaturization and weight reduction of portable electronic devices, there is a growing demand for secondary batteries having a high energy density that can cope with them.

Among the secondary batteries, a lithium-sulfur secondary battery is a secondary battery that uses sulfur-based compounds having a sulfur-sulfur bond as a positive electrode active material, and uses alkali metals such as lithium, carbon-based materials in which intercalation and deintercalation of metal ions such as lithium ions occur, or silicon or tin, which forms an alloy with lithium, as a negative electrode active material. Specifically, in the case of the lithium-sulfur secondary battery, during the discharging which is a reduction reaction, as the sulfur-sulfur bond is cut off, the oxidation number of sulfur decreases, and during the charging which is an oxidation reaction, as the oxidation number of sulfur increases, the sulfur-sulfur bond is re-formed. Through this oxidation-reduction reaction, electrical energy is stored and generated.

Particularly, in the case of lithium-sulfur secondary batteries, sulfur used as a positive electrode active material in the lithium-sulfur secondary batteries has a theoretical energy density of 1.675 mAh/g, and thus has a theoretical energy density of about five times higher than the positive electrode active material used in conventional lithium secondary batteries, and thus they are batteries capable of expressing high power and high energy density. In addition, since sulfur has the advantage of being cheap and rich in resources and thus being readily available and environmentally friendly, sulfur is drawing attention as an energy source not only for portable electronic devices but also for medium- and large-devices such as electric vehicles.

However, in the lithium-sulfur secondary battery, polysulfide is formed and leached at the positive electrode during operation, and a shuttling phenomenon may occur, and thus there is a problem that the positive electrode active material is irreversibly lost and the lifetime characteristics of the battery are lowered.

In order to solve the problem of degradation of the lifetime characteristics of the lithium-sulfur secondary battery, researches are being conducted on adding polysulfide adsorbents or redox mediators to the positive electrode or coating the surface of the separator with polysulfide adsorbing or repelling materials, etc.

For example, Japanese Laid-open Patent Publication No. 2004-179160 and Korean Laid-open Patent Publication No. 2015-046861 disclose a positive electrode for a lithium-sulfur secondary battery containing an inorganic additive, but there are some limitations in improving the lifetime characteristics of the battery.

Therefore, there is a continuing demand for the development of materials that can exhibit significant effects in improving the lifetime characteristics of a lithium-sulfur secondary battery.

RELATED ART

Japanese Patent Publication No. 2004-179160
Korean Patent Publication No. 2015-046861

SUMMARY

The inventors of the present disclosure have confirmed that if niobium tungsten oxide, which is a metal oxide-based additive, is added to the positive electrode for the lithium-sulfur secondary battery, the discharging capacity of the positive electrode and the lifetime characteristics of the battery are improved.

Therefore, it is an object of the present disclosure to provide a positive electrode for a lithium secondary battery with improved discharging capacity and lifetime characteristics.

It is another object of the present disclosure to provide a lithium secondary battery comprising the positive electrode for the lithium secondary battery having excellent discharging capacity and lifetime characteristics.

In order to achieve the above objects, the present disclosure provides a positive electrode for a lithium secondary battery comprising a positive electrode active material layer, wherein the positive electrode active material layer includes a sulfur-carbon composite as a positive electrode active material, a binder, and a metal oxide-based additive.

The present disclosure also provides a lithium secondary battery comprising the positive electrode described above, a negative electrode, and an electrolyte solution.

According to the present disclosure, by adding a metal oxide-based additive to the positive electrode for the lithium secondary battery, the capacity of the positive electrode can be improved, and the discharging capacity and lifetime characteristics of the battery can be improved.

DETAILED DESCRIPTION

Figure 1:
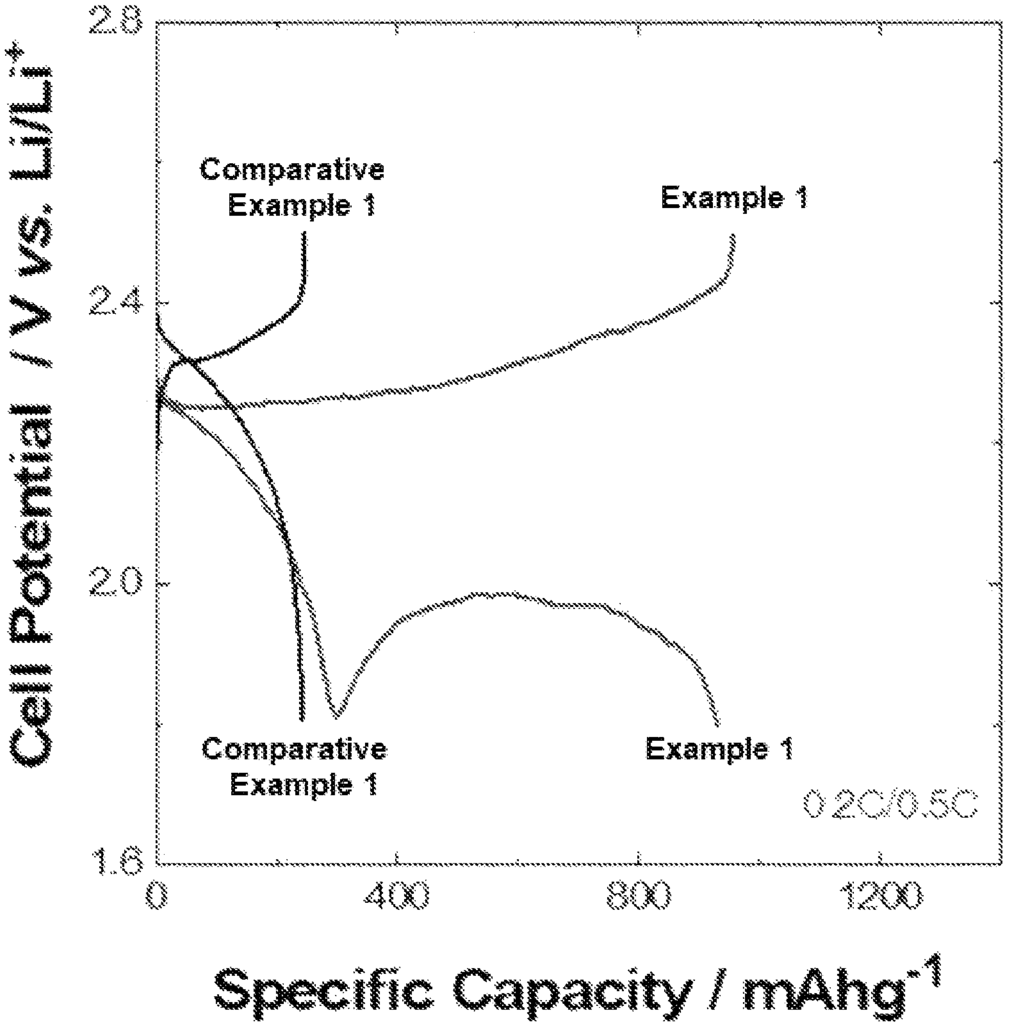
FIG. 1 is a graph showing the results of measuring the discharging capacity of the lithium-sulfur secondary batteries manufactured in Example 1 and Comparative Example 1, respectively.

Hereinafter, the present disclosure will be described in more detail to assist understanding of the present disclosure.

The terms and words used in the present specification and claims should not be construed as limited to ordinary or dictionary terms, and should be construed in a sense and concept consistent with the technical idea of the present disclosure, based on the principle that the inventor can properly define the concept of a term to describe his invention in the best way possible.

Positive Electrode for Lithium Secondary Battery

The present disclosure relates to a positive electrode for a lithium secondary battery, wherein the positive electrode comprises a positive electrode active material layer and the positive electrode active material layer comprises a sulfur-carbon composite, which is a positive electrode active material, a binder, and a metal oxide-based additive.

Specifically, the positive electrode for the lithium secondary battery of the present disclosure may comprise a positive electrode current collector; and a positive electrode active material layer formed on at least one surface of the current collector.

In the positive electrode for the lithium secondary battery according to the present disclosure, the metal oxide-based additive can be comprised in the positive electrode active material layer to improve the capacity of the positive electrode and improve the lifetime characteristics of the battery.

The metal oxide-based additive promotes the adsorption/desorption of polysulfide and the reaction from long-chain polysulfide to short-chain polysulfide, thereby suppressing a shuttling phenomenon of polysulfide.

The metal oxide-based additive may comprise one or more selected from the group consisting of niobium tungsten oxide, iron oxide, iron hydroxide, titanium oxide, zinc oxide, manganese oxide, nickel oxide, and silicon oxide.

For example, if the lithium secondary battery is a lithium-sulfur secondary battery, a shuttling phenomenon in which polysulfide diffuses from the positive electrode to the negative electrode occurs due to the sulfur component included in the positive electrode active material. If the diffusion of the polysulfide continues, the capacity of the positive electrode is reduced and the lifetime of the battery is reduced. Particularly, since long-chain polysulfide has high solubility in an organic electrolyte solution, it is necessary to suppress the shuttling phenomenon of polysulfide that occurs from the positive electrode to the negative electrode through the organic electrolyte solution. In the positive electrode containing the metal oxide-based additive, the adsorption/desorption of polysulfide and the reaction from long-chain polysulfide to short-chain polysulfide ($Li_2S_2$, $Li_2S$) are promoted, and the shuttling phenomenon of polysulfide can be suppressed. Accordingly, the degradation of the capacity of the positive electrode is minimized, and the lifetime characteristics of the battery can be improved.

In addition, the metal oxide-based additive may be contained in an amount of 1% to 10% by weight based on the total weight of the positive electrode active material layer. Specifically, the content of the metal oxide-based additive may be 1% by weight or more, 2% by weight or more, or 3% by weight or more, and may be 8% by weight or less, 9% by weight or less, or 10% by weight or less. If the content of the metal oxide-based additive is less than 1% by weight, the effect of improving the capacity of the positive electrode and the lifetime of the battery may be insignificant. If the content of the metal oxide-based additive exceeds 10% by weight, there may be a problem that the amount of active material in the electrode is reduced and the capacity is lowered.

In the positive electrode for the lithium secondary battery according to the present disclosure, the sulfur-carbon composite may be used as a positive electrode active material. The sulfur-carbon composite is a mixture of carbon material and sulfur to reduce the leakage of sulfur into the electrolyte and increase the electrical conductivity of the electrode containing sulfur.

The sulfur-carbon composite may contain sulfur and a carbon material, and specifically, may contain sulfur and the carbon material in a weight ratio of 55 to 90:45 to 10. If the content of sulfur and carbon material contained in the sulfur-carbon composite satisfies the above weight ratio, the capacity of the battery can be improved and conductivity can be maintained at the same time.

In addition, the sulfur-carbon composite may be contained in an amount of 60 to 95% by weight based on the total weight of the positive electrode active material layer, and specifically, may be contained in an amount of 60% by weight or more, 70% by weight or more, or 80% by weight or more, and may be contained in an amount of 93% by weight or less, 94% by weight or less, or 95% by weight or less. If the content is less than the above range, the performance of the battery may be deteriorated. If the content exceeds the above range, the content of the binder and/or metal oxide-based additive other than the positive electrode active material is relatively reduced, and thus the durability may be reduced or the effect of improving the capacity of the positive electrode or the lifetime characteristics of the battery may be insignificant.

In addition, in the sulfur-carbon composite, the sulfur may be selected from the group consisting of elemental sulfur (S8), a sulfur-based compound, and a sulfur-carbon composite. The sulfur-based compound may be specifically $Li_2Sn(n\geq1)$, an organic sulfur compound or a carbon-sulfur polymer($(C_2S_x)_n$: x=2.5~50, n≥2) etc.

In addition, in the sulfur-carbon composite, the carbon material may be a porous carbon material, and may generally be prepared by carbonizing various carbon material precursors.

The porous carbon material may comprise uneven pores therein, the average diameter of the pores is in the range of 1 to 200 nm, and specifically may be 1 nm or more, 5 nm or more, or 10 nm or more, and may be 100 nm or less, 150 nm or less, or 200 nm or less. In addition, the porosity of the porous carbon material may be in the range of 10 to 90% of the total volume of the porous carbon material, and specifically may be 10% or more, 15% or more, or 20% or more, and may be 70% or less, 80% or less, or 90% or less. If the average diameter and porosity of the pores are less than the above range, the pore size is only at the molecular level and impregnation with sulfur is impossible. On the contrary, if the average diameter and porosity of the pores exceeds the above range, the mechanical strength of the porous carbon material is weakened, which is not preferable for application to the manufacturing process of the electrode.

The shape of the porous carbon material is in the form of sphere, rod, needle, plate, tube, or bulk, and can be used without limitation as long as it is commonly used.

The porous carbon material may have a porous structure or a high specific surface area, and may be any of those conventionally used in the art. For example, the porous carbon material may be, but is not limited to, one or more selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon. Preferably, the porous carbon material may be graphite.

In the positive electrode for the lithium secondary battery according to the present disclosure, the binder may be styrene-butadiene rubber (SBR)/carboxymethyl cellulose (CMC), poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, copolymer (product name: Kynar) of polyhexafluoropropylene and polyvinylidene fluoride, poly(ethyl acrylate), polytetrafluoroethylene, polyvinylchloride, polyacrylonitrile, polyvinylpyridine, polystyrene, polyacrylic acid, and derivatives thereof, blends thereof, and copolymers thereof.

In addition, the content of the binder may be 1 to 20% by weight, preferably 3 to 18% by weight, and more preferably 5 to 15% by weight based on the total weight of the positive electrode active material layer. If the content of the binder is less than the above range, the binding force between the positive electrode active materials or between the positive electrode active materials and the current collector is greatly deteriorated, and the problem that capacity characteristic is deteriorated can also be prevented. In addition, it can be expected to inhibit the leaching of polysulfide by the interaction between polysulfide and a specific functional group in the polymer chain used as a binder. If the content of the binder exceeds the above range, the capacity of the battery may be lowered.

In the positive electrode for the lithium secondary battery according to the present disclosure, an electrically conductive material may be further comprised to secure a path for moving lithium ions of the positive electrode.

The electrically conductive material can form and maintain a conductive structure and pore distribution to secure a path for moving lithium ions in the positive electrode.

The electrically conductive material may be one or more selected from the group consisting of carbon blacks selected from Super P, Denka black, acetylene black, Ketjen black, channel black, furnace black, lamp black, and thermal black; carbon derivatives selected from carbon nanotubes and fullerene; electrically conductive fibers selected from carbon fiber and metal fiber; metal powders selected from carbon fluoride, aluminum and nickel powder; and electrically conductive polymers selected from polyaniline, polythiophene, polyacetylene, and polyphenol.

The electrically conductive material may be contained in an amount of 1 to 20% by weight based on the total weight of the positive electrode active material layer, and specifically, the content of the electrically conductive material may be 1% by weight or more, 3% by weight or more, or 5% by weight or more, and may be 15% by weight or less, 18% by weight or less, or 20% by weight or less. If the content of the electrically conductive material is less than the above range, it is difficult to form and maintain a conductive structure and a path for moving lithium ions throughout the positive electrode active material layer, so that the effect of increasing the discharging capacity of the battery and improving the overvoltage may be insignificant. If the content of the electrically conductive material exceeds the above range, the lifetime of the battery may rather be reduced.

In the positive electrode for a lithium secondary battery according to the present disclosure, the positive electrode current collector is not particularly limited as long as it has a high electrical conductivity without causing chemical changes in the battery. For example, stainless steel, aluminum, nickel, titanium, sintered carbon, or aluminum or stainless steel surface-treated with carbon, nickel, titanium, silver or the like can be used. At this time, the positive electrode current collector may have various forms such as a film, a sheet, a foil, a net, a porous body, a foam, and a non-woven fabric having fine irregularities formed on their surfaces to increase the adhesive strength with the positive electrode active material.

Manufacturing Method of Positive Electrode for Lithium Secondary Battery

The present disclosure also relates to a method for manufacturing a positive electrode for a lithium secondary battery. The manufacturing method of the positive electrode for the lithium secondary battery may comprise the steps of (S1) preparing a slurry for a positive electrode using a sulfur-carbon composite, a binder, and an electrically conductive material having high porosity; and (S2) coating and drying the slurry for the positive electrode on a positive electrode current collector.

In step (S1), a slurry for a positive electrode may be prepared using a sulfur-carbon composite, a binder, and an electrically conductive material having high porosity.

In order to manufacture the sulfur-carbon composite, the carbon material and sulfur are mixed in a prescribed weight ratio, and then heat treated at 120 to 180° C. for 10 minutes to 1 hour to prepare a sulfur-carbon composite. In that case, the specific type and weight ratio of the point-type carbon material and sulfur used are the same as described above.

Thereafter, a sulfur-carbon composite, a binder, and a metal oxide-based additive were mixed in a solvent to prepare a slurry for a positive electrode. The type and amount of the binder and the metal oxide-based additive used to prepare the slurry for the positive electrode are the same as described above.

The solvent used in preparing the slurry for the positive electrode may be one or more selected from the group consisting of water (distilled water), methanol, ethanol, isopropyl alcohol, acetone, dimethyl sulfoxide, formamide, dimethylformamide, dioxolane, acetonitrile, nitromethane, acetic acid, methyl formate, methyl acetate, phosphoric acid triesters, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate and ethyl propionate, and in particular, if water (distilled water) or anhydrous alcohol-based solvent is used, it is desirable because it can prevent the damage of the positive electrode active material.

The concentration of the slurry for the positive electrode is not particularly limited as long as it is such that the coating process can be performed smoothly.

In step (S2), the slurry for the positive electrode is coated on the positive electrode current collector and dried to form a positive electrode active material layer, thereby manufacturing a lithium secondary battery.

Lithium Secondary Battery

The present disclosure also relates to a lithium secondary battery comprising the positive electrode as described above.

The lithium secondary battery according to the present disclosure may comprise a positive electrode, a negative electrode, a separator interposed therebetween, and an electrolyte.

In the present disclosure, the negative electrode of the lithium secondary battery may comprise a negative electrode current collector and a negative electrode active material layer having a negative electrode active material formed on the negative electrode current collector.

As the negative electrode active material, lithium metal, a carbon material capable of intercalating and de-intercalating lithium-ion, silicon or tin may be used. As the carbon material, low crystalline carbon, high crystalline carbon and the like may all be used. The low crystalline carbon is typically soft carbon and hard carbon. The high crystalline carbon is typically natural graphite, Kish graphite, pyrolytic carbon, mesophase pitch-based carbon fiber, meso-carbon microbeads, mesophase pitches, and high-temperature sintered carbons such as petroleum or coal tar pitch derived cokes. In this case, the negative electrode may comprise a binder. The binder may be various kinds of binder polymers such as vinylidene fluoride-hexafluoropropylene copolymer (PVDF-co-HFP), polyvinylidene fluoride, polyacrylonitrile, polymethylmethacrylate, and the like.

In addition, the negative electrode current collector is not particularly limited as long as it has an electrical conductivity without causing chemical changes in the relevant battery, and for example, copper, stainless steel, aluminum, nickel, titanium, sintered carbon, or copper, or stainless steel surface-treated with carbon, nickel, titanium, silver or the like, or aluminum-cadmium alloy may be used. In addition, the negative electrode current collector may be used in various forms, such as a film, a sheet, a foil, a net, a porous body, a foam, and a non-woven fabric having fine irregularities formed on their surfaces, as in the positive electrode current collector.

In this case, the negative electrode active material layer may further include a binder, an electrically conductive material, a filler, and other additives.

The binder is used for bonding the electrode active material and the electrically conductive material and for bonding the current collector. Examples of such binder may comprise polyvinylidene fluoride (PVDF), polyvinyl alcohol, carboxymethylcellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, styrene-butadiene rubber, fluorine rubber, and various copolymers thereof.

The electrically conductive material is used to further improve the electrical conductivity of the electrode active material. The electrically conductive material is not particularly limited as long as it has electrical conductivity without causing chemical changes in the relevant battery, and for example, graphite such as natural graphite or artificial graphite; carbon blacks such as carbon black, acetylene black, Ketjen black, channel black, furnace black, lamp black, and thermal black; electrically conductive fibers such as carbon fiber and metal fiber; metal powders such as carbon fluoride, aluminum and nickel powder; electrically conductive whiskers such as zinc oxide and potassium titanate; electrically conductive metal oxides such as titanium oxide; polyphenylene derivative can be used.

The filler is selectively used as a component for suppressing the expansion of the electrode and is not specifically limited as long as it is a fibrous material without causing chemical change in the relevant battery, and for example, comprises olefin-based polymers such as polyethylene and polypropylene; and fibrous materials such as glass fiber and carbon fiber.

In the present disclosure, the separator may be formed of a porous substrate, and the porous substrate may be any porous substrate conventionally used in an electrochemical device. For example, a polyolefin-based porous membrane or a nonwoven fabric may be used as the porous substrate, but it is not particularly limited thereto.

Examples of the polyolefin-based porous membrane may comprise a membrane formed of polyolefin-based polymer, such as polyethylene such as high-density polyethylene, linear low-density polyethylene, low density polyethylene and ultra-high molecular weight polyethylene, polypropylene, polybutylene, and polypentene, alone or a mixture thereof.

The nonwoven fabric may include, in addition to the polyolefin-based nonwoven fabric, for example, a nonwoven fabric formed of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, and polyethylenenaphthalate alone or a mixture thereof. The structure of the nonwoven fabric may be a spun bond nonwoven fabric or a melt blown nonwoven fabric composed of long fibers.

The thickness of the porous substrate is not particularly limited, but may be 1 μm to 100 μm, or 5 μm to 50 μm.

The size and porosity of the pores present in the porous substrate are also not particularly limited, but may be 0.001 μm to 50 μm and 10% to 95%, respectively.

In the present disclosure, the electrolyte solution may be a nonaqueous electrolyte solution, and the electrolyte salt contained in the nonaqueous electrolyte solution is a lithium salt. The lithium salt is not particularly limited as long as it can be conventionally used in electrolyte solution for a lithium secondary battery. For example, the lithium salt may be one or more selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, lithium chloroborane, and 4-phenyl lithium borate.

As the organic solvent contained in the nonaqueous electrolyte solution, those conventionally used in an electrolyte solution for a lithium secondary battery may be used without limitation, and for example, ether, ester, amide, linear carbonate, cyclic carbonate, etc. may be used alone or in combination of two or more thereof. Among them, representatively, carbonate compounds that are cyclic carbonates, linear carbonates, or slurries thereof may be comprised.

Specific examples of the cyclic carbonate compound may comprise one or more selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinylethylene carbonate, and halides thereof, or a slurry of two or more thereof. Examples of such halides comprise, but are not limited to, fluoroethylene carbonate (FEC) and the like.

In addition, specific examples of the linear carbonate compound may representatively comprise, but is not limited to, one or more selected from the group consisting of dimethyl carbonate (DMC), diethyl carbonate (DEC), dipropyl carbonate, ethylmethyl carbonate (EMC), methylpropyl carbonate, and ethylpropyl carbonate, or a slurry of two or more thereof. Particularly, among the carbonate-based organic solvents, ethylene carbonate and propylene carbonate which are cyclic carbonates are highly viscous organic solvents and have a high dielectric constant, and thus can dissociate lithium salts in the electrolyte much better. When these cyclic carbonates are mixed with linear carbonates with a low viscosity and a low dielectric constant, such as dimethyl carbonate and diethyl carbonate, at a suitable ratio, an electrolyte solution having the higher electrical conductivity can be prepared.

In addition, the ether among the above organic solvents may be, but is not limited to, any one selected from the group consisting of dimethyl ether, diethyl ether, dipropyl ether, methylethyl ether, methylpropyl ether and ethylpropyl ether, or a slurry of two or more thereof.

In addition, the ester among the above organic solvents may be, but is not limited to, any one selected from the group consisting of methyl acetate, ethyl acetate, propyl acetate, methyl propionate, ethyl propionate, propyl propionate, γ-butyrolactone, γ-valerolactone, γ-caprolactone, α-valerolactone and ε-caprolactone, or a slurry of two or more thereof.

The injection of the non-aqueous electrolyte solution can be performed at an appropriate stage during the manufacturing process of the electrochemical device, depending on the manufacturing process and required physical properties of the final product. That is, such injection can be carried out before assembling the electrochemical device or in the final stage of assembling the electrochemical device.

In the case of the lithium secondary battery according to the present disclosure, it is possible to perform laminating or stacking and folding processes of the separator and the electrode, in addition to the winding process which is a general process.

In addition, the shape of the battery case is not particularly limited, and may be of various shapes such as a cylindrical shape, a laminate shape, a square shape, a pouch shape, or a coin shape. The structure and manufacturing method of these batteries are widely known in the art, and thus detailed description thereof will be omitted.

In addition, the lithium secondary battery may be classified into various batteries, such as a lithium-sulfur secondary battery, a lithium-air battery, a lithium-oxide battery, and a lithium all-solid battery, depending on the positive electrode/negative electrode material used.

In addition, the present disclosure provides a battery module comprising the lithium secondary battery as a unit cell.

The battery module may be used as a power source of medium or large-sized devices requiring high temperature stability, long cycle characteristics, and high capacity characteristics.

Examples of the medium or large-sized devices may comprise, but are not limited to, a power tool that is powered and moved by an electric motor; electric cars including an electric vehicle (EV), a hybrid electric vehicle (HEV), a plug-in hybrid electric vehicle (PHEV), and the like; an electric motorcycle including an electric bike (E-bike) and an electric scooter (E-scooter); an electric golf cart; and a power storage system.

Hereinafter, preferred examples are presented to aid understanding of the present disclosure, but the following examples are only illustrative of the present disclosure, and it will be apparent to those skilled in the art that various changes and modifications can be made within the scope and spirit of the present disclosure, and also it is natural that such variations and modifications are within the scope of the appended claims.

Example 1: Manufacture of Positive Electrode for Lithium-Sulfur Secondary Battery and Lithium-Sulfur Secondary Battery (1) Manufacture of Positive Electrode Sulfur and carbon nanotubes, which are carbon materials, were mixed in a weight ratio of 75:25, and then heat-treated at 155° C. for 30 minutes to prepare a sulfur-carbon composite.

90% by weight of the above sulfur-carbon composite, 5% by weight of styrene-butadiene rubber/carboxymethyl cellulose (SBR:CMC=7:3(w/w)) as binder, and 5% by weight of niobium tungsten oxide as a metal oxide-based additive were mixed and dissolved in water to prepare a slurry for a positive electrode having a concentration (20% based on solid content).

The slurry for the positive electrode was coated on an aluminum current collector to form a positive electrode active material layer, and dried and rolled to manufacture a positive electrode.

(2) Manufacture of Lithium-Sulfur Secondary Battery

The positive electrode prepared above was used as the positive electrode, lithium metal was used as the negative electrode, and an electrolyte solution prepared with a composition using a mixed solvent of 2-MF/DME (33:77, v/v) as the solvent of the electrolyte solution and containing 3% by weight of $LiNO_3$ (2-MF: 2-methylfuran, DME: dimethoxyethane) and a porous polyethylene separator were used to manufacture a pouch cell-type lithium-sulfur secondary battery.

Example 2

A positive electrode and a lithium-sulfur secondary battery were manufactured in the same manner as in Example 1, except that the content of niobium tungsten oxide, which is a metal oxide-based additive, is 3% by weight.

Example 3

A positive electrode and a lithium-sulfur secondary battery were manufactured in the same manner as in Example 1, except that the content of niobium tungsten oxide, which is a metal oxide-based additive, is 1% by weight.

Comparative Example 1

A positive electrode and a lithium-sulfur secondary battery were manufactured in the same manner as in Example 1, except that niobium tungsten oxide is not used in manufacturing the positive electrode.

Experimental Example 1: Analysis of Performance Improvement Effect of Lithium-Sulfur Secondary Battery An experiment was conducted to evaluate the performance of the lithium-sulfur secondary batteries prepared in Examples and Comparative Example, and the results are shown in Table 1 below.

(1) Evaluation of Discharging Capacity

For the lithium-sulfur secondary batteries prepared in each of Examples and Comparative Example, the discharging capacity was measured and compared by discharging until 0.1 C and 1.8V in constant current (CC) mode at 25° C. and charging up to 2.5V at 0.1 C constant current.

(2) Evaluation of Lifetime Performance

For the batteries subjected to the experiment for the evaluation of the discharging capacity, the lifetime performance was evaluated by discharging until 0.5 C and 1.8V in constant current (CC) mode at 25° C. and charging up to 2.5V at 0.2 C constant current.

TABLE 1

| | Result of physical property experiment depending on content of metal oxide-based additive | | | |
|---|---|---|---|---|
| | metal oxide-based additive | Content | Discharging capacity (0.1 C, mAh/g) | Lifetime (@0.5 C, 80% retention) |
| Example 1 | niobium tungsten oxide | 5% by weight | 1077 | 394 cycles |
| Example 2 | niobium tungsten oxide | 3% by weight | 1080 | 270 cycles |
| Example 3 | niobium tungsten oxide | 1% by weight | 1080 | inoperable |
| Comparative Example 1 | — | — | 1080 | inoperable |

As a result, as shown in Table 2, Example 1 and Example 2 showed excellent discharging capacity and lifetime characteristics.

In Example 3, the content of the metal oxide-based additive was further reduced compared to Example 1 and Example 2, and the discharge capacity was similar with those of Example 1 and Example 2, but it was impossible to operate until the lifetime characteristics were measured.

Comparative Example 1 is a case in which the metal oxide-based additive is not included, and shows results similar with those of Example 3.

FIG. 1 is a graph showing the results of measuring the discharging capacity of the lithium-sulfur secondary battery comprising the positive electrode manufactured in Example 1 and Comparative Example 1, respectively.

When comparing the possible 0.5 C discharging capacity, it can be seen that Example 1 is 930 mAh/g and Comparative Example 1 is 255 mAh/g, as shown in FIG. 1.

Figure 2:
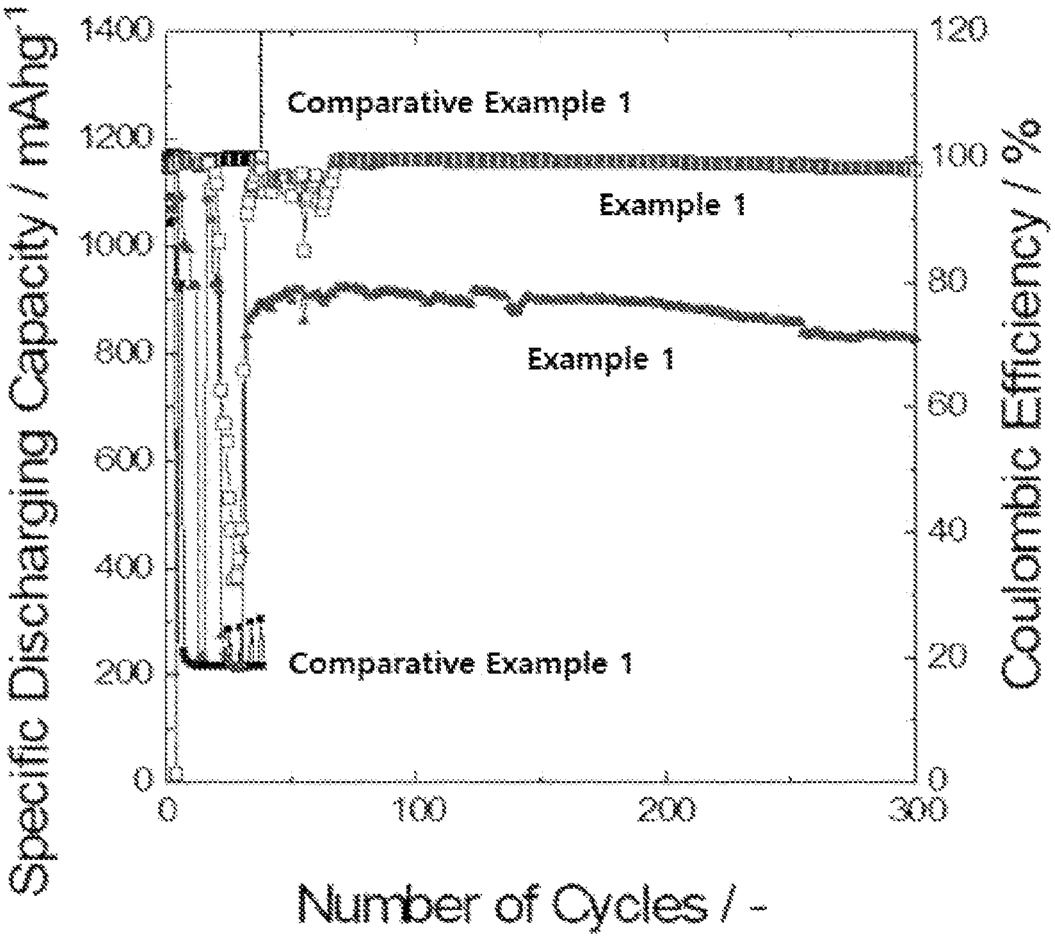
FIG. 2 is a graph showing the results of measuring the lifetime characteristics of the lithium-sulfur secondary batteries manufactured in Example 1 and Comparative Example 1, respectively.

FIG. 2 is a graph showing the results of measuring the lifetime characteristics of the lithium-sulfur secondary battery comprising the positive electrode manufactured in Example 1 and Comparative Example 1, respectively.

As shown in FIG. 2, Example 1 was able to operate for 300 cycles or more, but Comparative Example 1 was found to be inoperable.

From these results, it was confirmed that when a certain amount of metal oxide-based additive is added to the positive electrode of the lithium-sulfur secondary battery, the discharging capacity and lifetime characteristics of the battery can be improved.

In the above, although the present disclosure has been described by way of limited embodiments and drawings, the present disclosure is not limited thereto, and it is apparent to those skilled in the art that various modifications and variations can be made within the equivalent scope of the technical spirit of the present disclosure and the claims to be described below.

The invention claimed is:

1. A positive electrode for a lithium-sulfur secondary battery, the positive electrode comprising a positive electrode active material layer, wherein the positive electrode active material layer consists of a sulfur-carbon composite which is a positive electrode active material, a binder, and a metal oxide-based additive comprising niobium tungsten oxide, wherein the metal oxide-based additive is contained in an amount of 3 to 5% by weight based on the total weight of the positive electrode active material layer.

2. The positive electrode according to claim 1, wherein the metal oxide-based additive further comprises one or more selected from the group consisting of iron oxide, iron hydroxide, titanium oxide, zinc oxide, manganese oxide, nickel oxide, and silicon oxide.

3. The positive electrode according to claim 1, wherein the binder comprises one or more selected from the group consisting of styrene-butadiene rubber (SBR)/carboxymethyl cellulose (CMC), poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, copolymer of polyhexafluoropropylene and polyvinylidene fluoride, poly(ethyl acrylate), polytetrafluoroethylene, polyvinylchloride, polyacrylonitrile, polyvinylpyridine, polystyrene, polyacrylic acid, derivatives thereof, blends thereof, and copolymers thereof.

4. The positive electrode according to claim 1, wherein the positive electrode active material layer is formed on at least one surface of a positive electrode current collector.

5. The positive electrode according to claim 4, wherein the positive electrode current collector comprises stainless steel, aluminum, nickel, titanium, or sintered carbon.

6. A lithium secondary battery comprising the positive electrode of claim 1, a negative electrode, and an electrolyte solution.

7. The lithium secondary battery according to claim 6, wherein the lithium secondary battery is a lithium-sulfur secondary battery.

8. The lithium secondary battery according to claim 6, wherein the lithium secondary battery is a pouch-type lithium secondary battery.

9. The lithium secondary battery according to claim 6, wherein the negative electrode comprises lithium metal.

* * * * *